United States Patent
Jeol

(10) Patent No.: US 9,403,946 B2
(45) Date of Patent: Aug. 2, 2016

(54) THERMOPLASTIC COPOLYIMIDES

(71) Applicant: RHODIA OPERATIONS, Aubersvillers (FR)

(72) Inventor: Stephane Jeol, Lyons (FR)

(73) Assignee: RHODIA OPERATIONS, Aubersvilliers (FR)

( * ) Notice: Subject to any disclaimer, the term of this patent is extended or adjusted under 35 U.S.C. 154(b) by 0 days.

(21) Appl. No.: 14/345,059

(22) PCT Filed: Sep. 18, 2012

(86) PCT No.: PCT/EP2012/068368
§ 371 (c)(1),
(2) Date: Mar. 14, 2014

(87) PCT Pub. No.: WO2013/041531
PCT Pub. Date: Mar. 28, 2013

(65) Prior Publication Data
US 2014/0371390 A1    Dec. 18, 2014

(30) Foreign Application Priority Data

Sep. 20, 2011 (FR) ...................................... 11 58322
Oct. 20, 2011 (FR) ...................................... 11 59491

(51) Int. Cl.

| | |
|---|---|
| C08G 69/26 | (2006.01) |
| B29B 7/00 | (2006.01) |
| B29C 43/22 | (2006.01) |
| B29C 39/02 | (2006.01) |
| B29C 43/02 | (2006.01) |
| B29C 45/00 | (2006.01) |
| B29C 47/00 | (2006.01) |
| B29C 49/00 | (2006.01) |
| B29C 49/08 | (2006.01) |
| B29C 67/00 | (2006.01) |
| C08G 73/10 | (2006.01) |
| C08L 79/08 | (2006.01) |
| C08K 3/00 | (2006.01) |

(52) U.S. Cl.
CPC ............ *C08G 73/10* (2013.01); *C08G 73/1075* (2013.01); *C08G 73/1082* (2013.01); *C08L 79/08* (2013.01); *C08K 3/0033* (2013.01)

(58) Field of Classification Search
None
See application file for complete search history.

(56) References Cited

U.S. PATENT DOCUMENTS

| | | | |
|---|---|---|---|
| 2,710,853 A | 6/1955 | Edwards et al. | |
| 3,677,921 A * | 7/1972 | Stivers | 528/351 |
| 4,251,417 A | 2/1981 | Chow et al. | |
| 5,104,966 A * | 4/1992 | David | 528/310 |
| 7,932,012 B2 | 4/2011 | Komatsu et al. | |
| 2009/0029072 A1 | 1/2009 | Fujimoto et al. | |
| 2015/0045501 A1 | 2/2015 | Jeol | |

FOREIGN PATENT DOCUMENTS

| | | |
|---|---|---|
| DE | 1031510 B | 6/1958 |
| GB | 1037374 A | 7/1966 |
| JP | 2008308551 A | 12/2008 |

* cited by examiner

*Primary Examiner* — Susannah Chung
*Assistant Examiner* — Robert T Butcher
(74) *Attorney, Agent, or Firm* — Jarrod N. Raphael; Nikhil Patel

(57) ABSTRACT

The present invention relates to semiaromatic and semicrystalline thermoplastic polyimides obtained by polymerization of at least one aromatic compound comprising two anhydride functions and/or carboxylic acid and/or ester derivatives thereof and a diamine comprising between 13 and 22 carbon atoms. These polyimides may be converted into plastic articles by various methods, such as injection-molding.

12 Claims, No Drawings

THERMOPLASTIC COPOLYIMIDES

This application is a U.S. national stage entry under 35 U.S.C. §371 of International Application No. PCT/EP2012/068368, filed Sep. 18, 2012, which claims priority to FR 1158322, filed Sep. 20, 2011, and FR 1159491, filed Oct. 20, 2011. The whole content of each of these applications is hereby incorporated herein by reference for all purposes.

The present invention relates to semiaromatic and semicrystalline thermoplastic polyimides obtained by polymerization of at least one aromatic compound comprising two anhydride functions and/or carboxylic acid and/or ester derivatives thereof and a diamine comprising between 13 and 22 carbon atoms. These polyimides may be converted into plastic articles by various methods, such as injection-molding.

PRIOR ART

Technical polyamides are used for the preparation of numerous articles in various fields, such as the motor vehicle field, where specific properties of stiffness, impact strength, size stability, in particular at relatively high temperature, surface appearance, density and weight are particularly desired. The choice of a material for a given application is generally guided by the level of performance required with regard to certain properties and by its cost. Specifically, there is an ongoing search for novel materials that are capable of meeting specifications in terms of performance and/or costs.

However, certain polyamides have strong water uptake, which gives rise to problems linked to the size stability of the articles used in many applications. Certain polyamides also have insufficient heat resistance, especially a thermomechanical strength not allowing their use in applications in which there are constraints of this type to be respected.

There is thus a need to overcome these drawbacks while at the same time using polymers whose melting points are compatible with the transformation temperatures of standard thermoplastic polyamides, a melting point generally below 330° C., or even ranging from 200 to 280° C., and which can thus be transformed via the implementation processes known for thermoplastics, similar to polyamides, while at the same time benefiting from excellent heat resistance.

Certain polyimides were known in the prior art to attempt to solve this problem, but had implementation temperatures that were too high for them to be transformed via polyamide implementation processes. Moreover, the use of such temperatures leads to significant degradation of the polyimide matrix and to colorations that are detrimental for producing esthetic components. What is more, their high melting points prevent the use of certain additives, for instance organophosphorus fire retardants or natural fibers which decompose at such temperatures.

INVENTION

It has just been demonstrated by the Applicant that it is possible to prepare particular semiaromatic, semicrystalline thermoplastic polyimides by using as constituent monomer diamines bearing in their main chain at least 13 carbon atoms.

These polyimides have melting points that are entirely compatible with the transformation temperatures of standard thermoplastic polyamides, the polyimides according to the invention preferentially having a melting point Tf of between 50 and 310° C., and most particularly ranging from 200 to 280° C. These polyimides moreover have high crystallization temperatures enabling the production cycle times to be significantly reduced. The polyimides according to the invention preferentially have a glass transition temperature Tg of between −50° C. and +140° C.

These polyimides obtained are semicrystalline and thermoplastic and have the property of not releasing or absorbing water during the subsequent transformation steps, for instance pultrusion, extrusion or injection-molding. These polyimides are particularly hydrophobic and thus have excellent size stability.

The present invention thus relates to a semiaromatic semicrystalline thermoplastic polyimide obtained by polymerization of at least:
   (a) an aromatic compound comprising two anhydride functions and/or carboxylic acid and/or ester derivatives thereof; and
   (b) a diamine of formula (I) $NH_2$—R—$NH_2$ in which R is a saturated or unsaturated divalent aliphatic hydrocarbon-based radical, optionally comprising heteroatoms, the two amine functions being separated by at least 13 carbon atoms, the total number of carbon atoms in the radical R being between 13 and 22 (limits included); or
   an ammonium carboxylate salt obtained from monomers (a) and (b).

According to a first embodiment, the invention relates to a semiaromatic, semicrystalline thermoplastic polyimide obtained by polymerization of at least one ammonium carboxylate salt obtained from monomers (a) and (b), in which (a) is an aromatic tetracarboxylic acid compound, and (b) is a diamine of formula (I) $NH_2$—R—$NH_2$ in which R is a saturated or unsaturated divalent aliphatic hydrocarbon-based radical, optionally comprising heteroatoms, the two amine functions being separated by at least 13 carbon atoms, the total number of carbon atoms in the radical R ranging from 13 to 22. Most particularly, the polymerization involves one or two ammonium carboxylate salts, or even only one ammonium carboxylate salt, which is optionally imbalanced and/or bears a chain limiter.

The invention also relates to a process for manufacturing a semiaromatic, semicrystalline thermoplastic polyimide obtained by polymerization as described previously. The invention also relates to polyimides that may be obtained via the process as described previously.

The present invention also relates to an ammonium carboxylate salt obtained from at least the monomers (a) and (b), and in particular an ammonium carboxylate mixed salt comprising, or even consisting of, monomers (a) and (b), and at least one chain limiter.

The invention also relates to the use of a semiaromatic, semicrystalline thermoplastic polyamide as described in the present description or according to the invention, for the manufacture of a composition or an article having a low water uptake by weight.

DEFINITIONS

The term "semicrystalline" refers to a polyimide having an amorphous phase and a crystalline phase, for example having a degree of crystallinity of between 1% and 85%.

The term "thermoplastic polyimide" means a polyimide having a temperature above which the material softens and melts, and below which it becomes hard.

The determination of the melting point of the polyimide is preferably performed by measuring the temperature at the peak of the melting endotherm measured by differential scanning calorimetry (DSC), using a Perkin-Elmer Pyris 1 machine, heating the copolyimide from 20° C. at a rate of 10° C./minute.

The polyimides obtained from only one diamine and from an aromatic compound comprising two anhydride functions or derivatives are polyimides, generally known as homopolyimides. The reaction between at least three different monomers produces a copolyimide. (Co)polyimides may be defined by the molar composition of each constituent monomer.

For the purposes of the present invention, the term "low water uptake by weight on immersion at 23° C." means a water uptake on immersion at 23° C. after 1, 7 and 15 days, respectively, of less than or equal to 0.2, 0.5 and 0.75%.

Monomers

Compounds (a) preferentially bear carboxylic acid functions in positions such that they can generally form two acid anhydride functions on the same molecule via a dehydration reaction. The compounds of the present invention generally bear two pairs of carboxylic acid functions, each pair of functions being linked to an adjacent carbon atom, α and β. Tetracarboxylic acid functions may be obtained from acid dianhydrides by hydrolysis of the anhydride functions. Examples of acid dianhydrides and of tetracarboxylic acids, derived from dianhydrides, are described in U.S. Pat. No. 7,932,012.

Compounds (a) of the invention may also bear functional groups, especially, for instance, the group —$SO_3X$, with X=H or a cation, such as Na, Li, Zn, Ag, Ca, Al, K or Mg.

Compounds (a) of the invention are in particular tetracarboxylic acids. In particular, they contain no functional groups other than carboxylic acids.

Compounds (a) may comprise only one aromatic ring.

The aromatic compounds comprising two anhydride functions are preferentially chosen from the group consisting of: pyromellitic anhydride, 3,3',4,4'-biphenyltetracarboxylic dianhydride, 2,3,3',4'-biphenyltetracarboxylic dianhydride, 2,2',3,3'-biphenyltetracarboxylic dianhydride, 3,3',4,4'-benzophenonetetracarboxylic dianhydride, 2,2',3,3'-benzophenonetetracarboxylic dianhydride, 1,2,3,4-cyclopentanetetracarboxylic dianhydride, 1,2,5,6-naphthalenetetracarboxylic dianhydride, 2,3,6,7-naphthalenetetracarboxylic dianhydride and 2,2'-bis(3,4-dicarboxyphenyl)hexafluoropropanetetracarboxylic dianhydride.

The aromatic compounds comprising carboxylic acid functions derived from two anhydride functions are preferably chosen from the group consisting of: pyromellitic acid, 3,3',4,4'-biphenyltetracarboxylic acid, 2,3,3',4'-biphenyltetracarboxylic acid, 2,2',3,3'-biphenyltetracarboxylic acid, 3,3',4,4'-benzophenonetetracarboxylic acid, 2,2',3,3'-benzophenonetetracarboxylic acid, 1,2,5,6-naphthalenetetracarboxylic acid, 2,3,6,7-naphthalenetetracarboxylic acid, 2,3,5,6-pyridinetetracarboxylic acid, 3,4,9,10-perylenetetracarboxylic acid, 3,3',4,4'-tetraphenylsilanetetracarboxylic acid, 2,2'-bis(3,4-bicarboxyphenyl)hexafluoropropanetetracarboxylic acid.

Advantageously, compounds (a) are tetracarboxylic acids whose acid functions are such that they can give rise to two anhydride functions via a dehydration reaction.

The diamines (b) of formula (I) $NH_2$—R—$NH_2$ of the present invention thus bear a main chain separating the two amine functions and optionally one or more pendent chains, or side chains; the main chain comprising at least 13 carbon atoms and the total number of carbon atoms in the radical R being between 13 and 22. The radical R of the diamine may be saturated or unsaturated, linear or branched, aliphatic or cycloaliphatic, optionally comprising heteroatoms. The radical R may optionally contain one or more heteroatoms, such as O, N, P or S, and/or one or more functional groups such as hydroxyl, sulfone, ketone, ether or other functions.

Diamines (b) of the invention preferentially bear two primary amine functions.

Diamine (b) is preferentially chosen from the group consisting of: 1,13-diaminotridecane, 1,14-diaminotetradecane, 1,15-diaminopentadecane, 1,16-diaminohexadecane, 1,17-diaminoheptadecane, 1,18-diaminooctodecane, 1,19-diaminononadecane and 1,20-diaminoeicosane.

In particular, the diamines comprise from 14 to 16 carbon atoms, and are chosen especially from 1,14-diaminotetradecane, 1,15-diaminopentadecane and 1,16-diaminohexadecane. This may especially make it possible to obtain polyimide with a Tg of less than or equal to 85° C., or even less than or equal to 80° C., measured at 10° C./min. This is particularly advantageous in applications in which great flexibility, a low elastic modulus in the vitreous state and at the rubbery plateau, high chemical resistance and the lowest possible melting point are useful or even necessary, for example for the manufacture of flexible tubes via an extrusion process. The first and second embodiments may be combined.

According to a particular embodiment, the polyamide originates from a monomer (a) chosen from pyromellitic anhydride, 3,3',4,4'-biphenyltetracarboxylic dianhydride, 2,3,3',4'-biphenyltetracarboxylic dianhydride, 2,2',3,3'-biphenyltetracarboxylic dianhydride, pyromellitic acid, 3,3',4,4'-biphenyltetracarboxylic acid, 2,3,3',4'-biphenyltetracarboxylic acid and 2,2',3,3'-biphenyltetracarboxylic acid, and in particular monomer (a) is pyromellitic acid, and a monomer (b) which is a diamine comprising from 14 to 16 carbon atoms. Most particularly, a salt of pyromellitic acid and of an amine comprising from 14 to 16 carbon atoms is used.

This may especially make it possible to obtain a semicrystalline polyimide with a melting point ranging from 200 to 280° C.

Examples of diamines containing heteroatoms that may be mentioned include polyetherdiamines such as Jeffamine® and Elastamine® sold by Huntsman. A variety of polyethers exist, composed of ethylene oxide, propylene oxide or tetramethylene oxide units.

It is possible to obtain copolyimides by using different types of monomers (a) and/or (b); or even to add other types of monomers that are suitable also for obtaining imide functions.

It is entirely possible to prepare an ammonium carboxylate salt formed by reaction between the two monomers (a) and (b) mentioned previously. Such a salt may be synthesized in various ways, known to those skilled in the art.

For the purposes of the present invention, the term "ammonium carboxylate salt" means a salt in which the diamine and tetraacid species are linked solely via polar interactions, in particular of the type —COO$^-$H$_3^+$N—, and not via covalent bonding. More particularly, the salt comprises a tetraacid and a diamine, which are not linked via covalent bonding. In particular, the salt may have the following structure, with Ar representing an aromatic group:

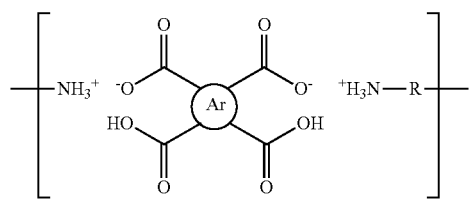

It is possible, for example, to add a diamine (b) to a solution comprising compound (a). It is also possible to dissolve compound (a) in a solvent such as an alcohol, for instance ethanol or methanol, and to do the same for diamine (b). These two solutions are then mixed together with stirring. The ammonium carboxylate salt formed may be insoluble in the solvent used and thus precipitate out. The salt may then be recovered by filtration, washed and dried, and optionally ground.

It is also possible to make a solution of the ammonium carboxylate salt and then to concentrate it while hot and then cool it. The salt then crystallizes and the crystals are recovered and dried. Concentration of the solution may be obtained by evaporating off the solvent such as water or the alcohol or, according to another process, by adding compound (a) and/or diamine (b). It is also possible to perform saturation of the solution, i.e. to perform a process for modifying the concentration of the salt in the solution to a value that is compatible with its crystallization. Generally, this concentration is at least equal to and more preferentially greater than the saturation concentration of the salt at the temperature under consideration. More precisely, this concentration corresponds to supersaturation of the salt solution. It is also possible to work at a pressure that enables the solvent of the solution, such as water or the alcohol, to evaporate off, so as to saturate the solution and bring about crystallization. It is also possible to saturate the solution by successive or simultaneous addition of a stream of compound (a) and of a stream of diamine (b) to a salt solution.

By way of example, compound (a) is dissolved in alcohol, for instance ethanol, in a first medium. Diamine (b) is dissolved in alcohol in another medium and the two media are then mixed together with stirring. The salt obtained precipitates out.

At the end of this synthesis, the salt may be in the form of a dry powder, in the form of a powder dispersed in a solvent, or dissolved in solution. The salt may be recovered by filtration in the case of a precipitate, and the filter cake may be disintegrated, if necessary. When the salt is dissolved in solution, it may be recovered via a crystallization process by concentration or supersaturation or by making it precipitate out by addition of a non-solvent. The crystalline salt may then be recovered by filtration and the filter cake may be disintegrated, if necessary. Another process for recovering the dispersed particles of dry salt is spraying of the solution, i.e. in particular an operation of sudden evaporation of the solvent sprayed in the form of fine droplets so as to recover the dispersed salt particles.

Finally, it is possible to screen the salt particle size, for example by sifting or milling.

The polymerization process may be performed according to the standard processes known to those skilled in the art.

According to an advantageous variant, optionally combined with one or more particular embodiments, it is possible to polymerize the salts in the solid state. The fundamental principle of these processes consists in bringing the starting salt, in air or under an inert atmosphere or under vacuum, to a temperature below its melting point but sufficient to allow the polymerization reaction, generally above the glass transition temperature of the polyimide. Such a polymerization process may thus comprise, in brief:

a) heating of the product by conductive or convective diffusion or by radiation,
b) inertizing by applying a vacuum, flushing with a neutral gas such as nitrogen, $CO_2$ or superheated steam, or application of a positive pressure,
c) removing the condensation by-product by evaporation, and then flushing with the carrier gas or concentrating the gas phase,
d) stirring mechanically or fluidizing the solid phase with the carrier gas or vibrations may be desirable in order to improve the heat and mass transfers and also to prevent any risk of aggregation of the divided solid.

The absolute pressure during the polymerization is preferentially between 0.005 MPa and 0.2 MPa. The temperature during the polymerization is preferentially between 50° C. and 250° C.

Preferentially, during polymerization, a means for keeping the polyimide salt particles in motion is used so as to prevent aggregation of these particles. A mechanical means may be used to do this, such as a stirrer, or rotation of the reactor or agitation by vibration, or fluidization with a carrier gas.

According to a particular embodiment, the polyimide is obtained by a polymerization involving an ammonium carboxylate salt obtained from monomers (a) and (b), and in particular a dry salt. For the purposes of the present invention, the term "dry salt" means that the polymerization is not performed in solution or in suspension in a solvent, nor in the melt. In particular, the polymerization does not involve the addition of solvent to the powder(s) placed in the reactor.

The number-average molar mass Mn of the polyimides may be between 500 g/mol and 50 000 g/mol.

Control of the number-average molar mass may be obtained:

by using chain limiters, i.e. molecules chosen from monoamines, monoanhydrides, monoacids or diacids in $\alpha,\beta$ positions such that they can form an anhydride function by dehydration reaction; among the chain limiters, mention may be made of phthalic anhydride, 1,2-benzenedicarboxylic acid or orthophthalic acid, acetic acid, propionic acid, benzoic acid, stearic acid, benzylamine, 1-aminopentane, 1-aminohexane, 1-aminoheptane, 1-aminooctane, 1-aminononane, 1-aminodecane, 1-aminoundecane and 1-aminododecane, benzylamine, and mixtures thereof, via a stoichiometric imbalance r=[compound (a)]/[diamine (b)], by using branching agents, i.e. molecules with functionality of greater than 3, by adjusting the synthetic operating conditions such as the residence time, the temperature, the humidity or the pressure, by a combination of these various means.

In particular, the stoichiometric imbalance r may range from 1.01 to 1.2. That is to say that the imbalance is in particular linked to an excess of monomer (a), and more particularly of tetracarboxylic acid.

According to a particular embodiment, the monomers are, and in particular the salt is:

supplemented with at least one chain limiter and/or
supplemented with an excess of one of the monomers, so as to create a stoichiometric imbalance, i.e. such that r is other than 1.

According to a variant, the chain limiter and/or the stoichiometric excess is added to the salt of step (a) already formed.

According to another variant, the chain limiter and/or the stoichiometric excess of one of the monomers is also in salt form, and in particular it forms a salt with the aliphatic diamine and/or with the tetracarboxylic acid. It may thus be a salt having a stoichiometric imbalance and/or a co-salt or mixed salt of the aliphatic diamine, of tetracarboxylic acid and of chain limiter. Most particularly, the chain limiter and/ or the stoichiometric excess is present during the formation of the salt of step (a) and is added at the same time as the species corresponding thereto, for example the limiter of acid type is in a mixture with the tetracarboxylic acid and the limiter of amine type is in a mixture with the aliphatic diamine.

In this second case, the chain limiter allows the formation of salt, and may be chosen especially from the above lists, with the exception of the anhydrides.

The content of chain limiter may range from 0.1% to 10% as a number of moles, especially from 1% to 5% as a number of moles, relative to the total number of moles of monomers, i.e. of monomers (a), (b) and (c) and chain limiter, or even more particularly tetracarboxylic acid, diamine and chain limiter.

When a chain limiter is used, the amounts of amines and of acids may be equilibrated, i.e. the sum of the amine functions is substantially equal to half the sum of acid functions with which they may react. The term "substantially equal" means a maximum difference of 1%.

When a chain limiter is used, the amounts of amines and of acids may be imbalanced, i.e. the sum of the amine functions is substantially different from half the sum of acid functions with which they may react. The term "substantially different" means a difference of at least 1%.

A subject of the invention is thus also a salt of tetracarboxylic acid and of diamine:
in which a chain limiter is also present and/or
which has a stoichiometric imbalance, especially an excess of tetracarboxylic acid,
and also to the use of such a salt for forming a (co)polyimide and to a process for preparing (co)polyimide using such a salt.

Control of the stoichiometry may be performed at any point in the manufacturing process.

Use may be made of catalysts, added at any point in the process, for instance as a mixture with compound (a), and/or diamine (b), as a mixture with the salt formed either as a solution or by impregnation in the solid state.

It is also possible to form a polymerization in the melt to obtain polyimides, as described, for example, in U.S. Pat. No. 2,710,853. A solvent polymerization may also be performed, especially by following the conventional routes for synthesizing polyimides in solvent, in two steps, for example proceeding via a polyamic acid.

Compositions

The polyimide of the invention may be used to make compositions that are generally obtained by mixing the various compounds, fillers and/or additives. The process is performed at more or less high temperature and at more or less high shear force, according to the nature of the various compounds. The compounds can be introduced simultaneously or successively. Use is generally made of an extrusion device in which the material is heated, then melted and subjected to a shear force, and conveyed. According to particular embodiments, it is possible to prepare preblends, optionally in the melt, before preparation of the final composition. It is possible, for example, to prepare a preblend in a resin, for example of the polyimide, so as to make a masterbatch.

The invention thus also relates to a process for manufacturing a composition by mixing, optionally in the melt, the polyimide with reinforcing or bulking fillers, and/or impact modifiers and/or additives. The invention also relates to a composition comprising at least the polyimide, reinforcing or bulking fillers and/or impact modifiers and/or additives.

The composition according to the invention may comprise one or more other polymers.

The composition according to the invention may comprise between 20% and 90% by weight, preferentially between 20% and 70% by weight and more preferentially between 35% and 65% by weight of polyimide according to the invention, relative to the total weight of the composition.

The composition can additionally comprise reinforcing or bulking fillers. Reinforcing or bulking fillers are fillers conventionally used for the production of thermoplastic compositions, especially based on polyamide. Mention may in particular be made of reinforcing fibrous fillers, such as glass fibers, carbon fibers or organic fibers, non-fibrous fillers such as particulate or lamellar fillers and/or exfoliable or non-exfoliable nanofillers, for instance alumina, carbon black, clays, zirconium phosphate, kaolin, calcium carbonate, copper, diatomaceous earths, graphite, mica, silica, titanium dioxide, zeolites, talc, wollastonite, polymeric fillers, such as, for example, dimethacrylate particles, glass beads or glass powder. Preferably, reinforcing fibers, such as glass fibers, are in particular used.

The composition according to the invention can comprise between 5% and 60% by weight of reinforcing or bulking fillers and preferentially between 10% and 40% by weight, relative to the total weight of the composition.

The composition according to the invention comprising the polyimide as defined previously may comprise at least one impact modifier, i.e. a compound that is capable of modifying the impact strength of a polyimide composition. These impact modifiers preferentially comprise functional groups that are reactive with the polyimide. According to the invention, the term "functional groups that are reactive with the polyimide" means groups that are capable of reacting or of interacting chemically with the anhydride, acid or amine residual functions of the polyimide, in particular by covalency, ionic or hydrogen bond interaction or van der Waals bonding. Such reactive groups make it possible to ensure good dispersing of the impact modifiers in the polyimide matrix. Examples that may be mentioned include anhydride, epoxide, ester, amine and carboxylic acid functions and carboxylate or sulfonate derivatives.

The composition according to the invention may also comprise additives normally used for the manufacture of polyimide or polyamide compositions. Thus, mention may be made of lubricants, flame retardants, plasticizers, nucleating agents, anti-UV agents, catalysts, antioxidants, antistatic agents, dyes, mattifying agents, molding aids or other conventional additives.

These fillers, impact modifiers and additives may be added to the polyimide via suitable usual means that are well known in the field of technical plastics, for instance during salification, after salification, during polymerization, or as a molten mixture.

The polyimide compositions are generally obtained by blending the various compounds included in the composition without heating or in the melt. The process is performed at more or less high temperature and at more or less high shear force, according to the nature of the various compounds. The compounds can be introduced simultaneously or successively. Use is generally made of an extrusion device in which the material is heated, then melted and subjected to a shear force, and conveyed.

It is possible to blend all the compounds in the molten phase during a single operation, for example during an extrusion operation. It is possible, for example, to blend granules of the polymer materials, to introduce them into the extrusion device in order to melt them and to subject them to more or less high shearing. According to specific embodiments, it is possible to preblend some of the compounds, in the melt or not in the melt, before preparation of the final composition.

Applications

The polyimide or the various compositions according to the invention may be used for any forming process for the manufacture of plastic articles. In particular, in the case where good fluidity is desirable, such as injection or melt extrusion, the (co)polyimide may be imbalanced and/or may comprise chain limiters.

The invention thus also relates to a process for manufacturing plastic articles, using the polyimides of the invention. To this end, mention may be made of various techniques such as the molding process, especially injection molding, extrusion, extrusion blow-molding, or alternatively rotary molding, especially in the field of motor vehicles or of electronics and electricity, for example. The extrusion process may especially be a spinning process or a process for manufacturing films.

The present invention relates, for example, to the manufacture of articles of impregnated fabric type or composite articles containing continuous fibers. These articles may especially be manufactured by placing in contact a fabric and polyimide according to the invention in the solid or molten state. Fabrics are textile surfaces obtained by assembling yarns or fibers which are rendered integral by any process, especially such as adhesive bonding, felting, braiding, weaving or knitting. These fabrics are also referred to as fibrous or filamentous networks, for example based on glass fiber, carbon fiber or the like. Their structure may be random, unidirectional (1D) or multidirectional (2D, 2.5D, 3D or other).

Specific language is used in the description so as to facilitate understanding of the principle of the invention. Nevertheless, it should be understood that no limitation on the scope of the invention is envisaged by the use of this specific language. Modifications, improvements and refinements can in particular be envisaged by a person conversant with the technical field concerned on the basis of his own general knowledge.

The term "and/or" includes the meanings and, or and all the other possible combinations of the elements connected to this term.

Other details or advantages of the invention will become more clearly apparent in the light of the examples given below purely by way of indication.

EXPERIMENTAL SECTION

Measuring Standards

The melting point (Tf) and the crystallization temperature on cooling (Tc) of the polyimides are determined by differential scanning calorimetry (DSC) by means of a Perkin Elmer Pyris 1 instrument, at a rate of 10° C./min. The Tf and Tc of the polyimides are determined at the top of the melting and crystallization peaks. The glass transition temperature (Tg) is determined on the same machine at a rate of 40° C./min (when possible, it is determined at 10° C./min and specified in the examples). The measurements are taken after melting the polyimide formed at T>(Tf of the polyimide+20° C.).

For the determination of the melting point of the salt, the end temperature of the endotherm measured by heating the salt at 10° C./min is considered. Thermogravimetric analysis (TGA) is performed on a Perkin-Elmer TGA7 machine on a sample of about 10 mg. The precise conditions of use (temperature, time, heating rate) are defined in the examples.

Thermogravimetric analysis makes it possible to determine the thermal stability of the polyimides, but it is used here also to calculate the yield of the reaction for conversion of the salt into polyimide in the following manner:

heating at 10° C./min of a sample of salt polymerized via the process of the invention from 30° C. to 300° C. Determination of the loss of mass observed noted y %.

determination of the degree of reaction η by calculating η=(1+x)/(1+y)−1, with x being the ratio of the molar mass of the "PI salt" in g/mol to the molar mass of a repeating unit PI. For example, for PI 13PMA prepared from pyromellitic acid (PMA) and 1,13-diaminotridecane, x=15.38%.

The Fourier-transform infrared (FTIR) analysis is performed on a Brüker Vector 22 machine (in reflection, ATR Diamant) on the powder of formed polyimide.

The particle size analysis is performed on a Sympatec Helos H1302 machine in the dry route, with a dispersion pressure of 2 bar of nitrogen.

Example 1

Preparation of a Polyimide PI 13PMA from a Salt 13PMA Synthesized in Pure Ethanol 1,13-Diaminotridecane is synthesized via nitrilation of a 99% 1,13-tridecanedicarboxylic acid (Zibo Guangtong Chem) followed by hydrogenation. The purity of the C13 diamine is 93%.

40 g (0.15 mol) of 94.9% pyromellitic acid and 2 liters of pure ethanol are placed in a 5 L reactor. The reaction medium is stirred and heated to 70° C. while flushing gently with nitrogen. 34.5 g (0.15 mol) of 93% 1,13-diaminotridecane are dissolved in 500 mL of pure ethanol at room temperature in a 1 L round-bottomed flask. This solution is then placed in a dropping funnel connected to the 5 L reactor and added dropwise over 1 hour to the ethanolic solution of pyromellitic acid. The contact between the diamine and the pyromellitic acid gives rise to the formation of a salt which precipitates out immediately with stirring. The reaction medium is kept stirring vigorously for 3 hours 30 minutes at 70° C. and under nitrogen.

The salt powder is recovered by filtration through a Büchner funnel and washed with ethanol, ground and then dried under vacuum at 50° C. overnight. The mass yield is 85%, due to losses during the emptying of the reactor. The powder is fine and white. The melting point of the salt is 230° C.

Polymerization

The 13PMA salt powder is placed in a cannulated flask attached to a rotavapor and placed under a gentle flush of nitrogen. The pressure is equal to atmospheric pressure. The flask is immersed in an oil bath at 200° C. and rotated for 8 hours. The PI 13PMA powder obtained is white and totally dry. The particles exhibit a median diameter D50 of 179 μm. TGA analysis is performed on the final product, by heating from 40° C. to 300° C. at 10° C./min. No detectable loss of mass appears, indicating that the 13PMA salt powder has been quantitatively converted into PI 13PMA powder.

FTIR analysis of the PI 13PMA powder has the characteristic absorption bands of imide functions at 1700 and 1767 cm$^{-1}$ and the absence of characteristic absorption bands of amine functions is noted.

The PI 13PMA powder has a melting point of 271° C. (heat of fusion ΔHf=36 J/g), a crystallization temperature of 238° C. and a Tg=93° C.

Extrusion

The PI 13PMA powder is extruded in rod form by placing 10 g of the PI 13PMA thus prepared in a DSM MIDI 2000 twin-screw micro-extruder (micro-compounder) (volume 15 cm$^3$) preheated to 300° C. and with a screw speed of 100 rpm.

The melting point of the PI 13PMA rod extruded from powder is 270° C., i.e. identical to the melting point of the PI 13PMA powder before extrusion. It will be noted that the extrusion is easier to perform with PI 13PMA than with PI 12PMA known in the prior art, which has a melting point of 303° C. and a Tc of 274° C., which must be used at higher temperature.

Injection

The PI 13PMA powder is injected using an injection micro-press associated with the "micro-compounder" by melting the PI 13PMA at 300° C. and injecting into a mold set at 200° C. to form bars 80×12×2 mm$^3$ in size. The bars are rigid but have a certain amount of flexibility.

Water Uptake

The water uptake by weight on immersion is performed by immersing the bars of mass m0 in demineralized water at room temperature. After a given time t, the bars are removed, wiped and weighed to determine their mass mt: the water uptake by weight is determined by the calculation (mt−m0)/m0. When the mass mt no longer changes, the water uptake at equilibrium is obtained. Thus, the water uptake of PI 13PMA reaches, respectively, 0.12%, 0.30% and 0.32% after 1, 7 and 15 days of immersion.

Example 2

Preparation of Polyimides PI 14PMA (Example 2A), PI 15 PMA (Example 2B) and PI 16PMA (Example 2C) from Salts of PI 14PMA, 15PMA and 16PMA Synthesized in Pure Ethanol The diamines 1,14-diaminotetradecane, 1,15-diaminopentadecane and 1,16-diaminohexadecane are synthesized via nitrilation, respectively, of 99% pure 1,14-tetradecanedicarboxylic acid, 96.8% pure 1,15-pentadecanedicarboxylic acid and 98.8% pure 1,16-hexadecanedicarboxylic acid (Cathay Biotech, China) followed by hydrogenation.

The salts of PI 14PMA, 15PMA and 16PMA are prepared according to the protocol of Example 1. The polyimides PI 14PMA (Example 2A), PI 15PMA (Example 2B) and PI 16PMA (Example 2C) are obtained by heating at 200° C. for 5 hours of the salts placed in cannulated round-bottomed flasks attached to a rotavapor with stirring and flushing with nitrogen.

The PI 14PMA, PI 15PMA and PI 16PMA powders have a melting point equal to, respectively, 263° C., 244° C., 249° C., and a crystallization temperature equal to, respectively, 245° C., 228° C., 230° C. The Tg values of these polymers are equal to, respectively, 74° C. (measured at 10° C./min), 78° C./73° C. (measured, respectively, at 40° C./min and at 10° C./min) and 75° C./71° C. (measured, respectively, at 40° C./min and at 10° C./min). It is preferred to have a low Tg for applications requiring great flexibility, a low elastic modulus in the vitreous state and at the rubbery plateau, high chemical resistance and also the lowest possible melting point, for example for the manufacture of flexible tubes via the extrusion process. This therefore demonstrates the interest and advantages of these diamines bearing long carbon-based chains.

The invention claimed is:

1. A semiaromatic semicrystalline thermoplastic polyimide obtained by polymerization of at least:
   (a) an aromatic compound comprising two anhydride functions and/or carboxylic acid and/or ester derivatives thereof, wherein the aromatic compound comprising the carboxylic acid is selected from the group consisting of: pyromellitic acid, 3,3',4,4'-biphenyltetracarboxylic acid, 2,3,3',4'-biphenyltetracarboxylic acid, 2,2',3,3'-biphenyltetracarboxylic acid, 3,3',4,4'-benzophenonetetracarboxylic acid, 2,2',3,3'-benzophenonetetracarboxylic acid, 1,2,5,6-naphthalenetetracarboxylic acid, 2,3,6,7-naphthalenetetracarboxylic acid, 2,3,5,6-pyridinetetracarboxylic acid, 3,4,9,10-perylenetetracarboxylic acid, 3,3',4,4'-tetraphenylsilanetetracarboxylic acid, 2,2'-bis(3,4-bicarboxyphenyl)hexafluoropropanetetracarboxylic acid; and
   (b) a diamine selected from the group consisting of: 1,14-diaminotetradecane, 1,15-diaminopentadecane, and 1,16-diaminohexadecane; or
   an ammonium carboxylate salt obtained from monomers (a) and (b).

2. The polyimide as claimed in claim 1, wherein the polyimide is obtained by polymerization of at least one ammonium carboxylate salt obtained from monomers (a) and (b).

3. The polyimide as claimed in claim 1, wherein the polyimide is obtained with addition of chain limiter(s) and/or supplemented with an excess of one of the monomers, so as to create a stoichiometric imbalance.

4. The polyimide as claimed in claim 1, wherein the polyimide has a melting point Tf of between 50 and 310° C.

5. The polyimide as claimed in claim 1, wherein the aromatic compound comprising two anhydride functions is selected from the group consisting of: pyromellitic anhydride, 3,3',4,4'-biphenyltetracarboxylic dianhydride, 2,3,3',4'-biphenyltetracarboxylic dianhydride, 2,2',3,3'-biphenyltetracarboxylic dianhydride, 3,3',4,4'-benzophenonetetracarboxylic dianhydride, 2,2',3,3'-benzophenonetetracarboxylic dianhydride, 1,2,5,6-naphthalenetetracarboxylic dianhydride, 2,3,6,7-naphthalenetetracarboxylic dianhydride and 2,2'-bis(3,4-dicarboxyphenyl)hexafluoropropanetetracarboxylic dianhydride.

6. The polyimide as claimed in claim 1, wherein the number-average molar mass Mn of the polyimide is between 500 g/mol and 50000 g/mol.

7. A process for manufacturing a polyimide, comprising polymerizing at least:
   an aromatic compound comprising two anhydride functions and/or carboxylic acid and/or ester derivatives thereof, wherein the aromatic compound comprising the carboxylic acid is selected from the group consisting of: pyromellitic acid, 3,3',4,4'-biphenyltetracarboxylic acid, 2,3,3',4'-biphenyltetracarboxylic acid, 2,2',3,3'-biphenyltetracarboxylic acid, 3,3',4,4'-benzophenonetetracarboxylic acid, 2,2',3,3'-benzophenonetetracarboxylic acid, 1,2,5,6-naphthalenetetracarboxylic acid, 2,3,6,7-naphthalenetetracarboxylic acid, 2,3,5,6-pyridinetetracarboxylic acid, 3,4,9,10-perylenetetracarboxylic acid, 3,3',4,4'-tetraphenylsilanetetracarboxylic acid, 2,2'-bis(3,4-bicarboxyphenyl)hexafluoropropanetetracarboxylic acid; and
   a diamine selected from the group consisting of: 1,14-diaminotetradecane, 1,15-diaminopentadecane, and 1,16-diaminohexadecane; or an ammonium carboxylate salt obtained by polymerization of monomers (a) and (b).

8. A composition, comprising at least one polyimide as claimed in claim 1 and reinforcing or bulking fillers and/or impact modifiers and/or additives.

9. A process for manufacturing a plastic article, comprising forming at east one polyimide as claimed in claim 1.

10. The process of claim 9, wherein the forming step is selected from the group consisting of injection molding, melt extrusion, extrusion-blow molding, rotary molding of the polyimide, and placing the polyimide in the solid or molten state in contact with a fabric.

11. The polyimide as claimed in claim 1, wherein the polyimide has a glass transition temperature (Tg) of less than or equal to 85° C., measured by differential scanning calorimetry at 10° C./min.

12. The polyimide as claimed in claim 1, wherein the polyimide has a glass transition temperature (Tg) of less than or equal to 80° C., measured by differential scanning calorimetry at 10° C./min.

* * * * *